US006982713B2

(12) United States Patent
Shao et al.

(10) Patent No.: US 6,982,713 B2
(45) Date of Patent: Jan. 3, 2006

(54) SYSTEM AND METHOD FOR CLEARING DEPTH AND COLOR BUFFERS IN A REAL-TIME GRAPHICS RENDERING SYSTEM

(75) Inventors: Pingping Shao, Sunnyvale, CA (US); Jianbo Zhang, Sunnyvale, CA (US); Guofang Jiao, Sunnyvale, CA (US); Chun Yu, Sunnyvale, CA (US); Linglan Zhang, Sunnyvale, CA (US); Jinshan Zheng, Shanghai (CN)

(73) Assignee: XGI Technology Inc., Hsinchu (TW)

( * ) Notice: Subject to any disclaimer, the term of this patent is extended or adjusted under 35 U.S.C. 154(b) by 326 days.

(21) Appl. No.: 10/341,842

(22) Filed: Jan. 13, 2003

(65) Prior Publication Data
US 2004/0135781 A1 Jul. 15, 2004

(51) Int. Cl.
  *G06T 15/40* (2006.01)
(52) U.S. Cl. ....................................... 345/422
(58) Field of Classification Search ................. 345/422
  See application file for complete search history.

(56) References Cited

U.S. PATENT DOCUMENTS

| 5,748,864 | A | * | 5/1998 | Martin ........................ 345/422 |
| 5,923,333 | A | * | 7/1999 | Stroyan ....................... 345/422 |
| 6,285,779 | B1 |  | 9/2001 | Lapidous et al. |
| 2001/0028354 | A1 |  | 10/2001 | Cheng et al. |
| 2002/0171654 | A1 | * | 11/2002 | Selig et al. .................. 345/545 |
| 2003/0090486 | A1 | * | 5/2003 | Ashburn et al. ............ 345/422 |
| 2003/0160788 | A1 | * | 8/2003 | Buehler ....................... 345/422 |
| 2003/0201994 | A1 | * | 10/2003 | Taylor et al. ................ 345/581 |

OTHER PUBLICATIONS

Xie, Feng, et al., "Adaptive Hierarchical Visibility in A Tiled Architecture", 1999, pp. 75-84, 142, ACM Press.
Greene, Ned, "Occlusion Curlling With Optimized Hierarchical Z-Buffering", NVIDIA, 1999, pp. H-21-H31.
Morein, Steve, "ATI Radeon HyperZ Technology", 2000, Eviographics Siggraph Workshop Program and Presentations, Slides.
Greene, Ned, et al., "Hierarchical Z-Buffer Visibility", In Proceedings of Siggraph, 1993, pp. 231-238.

* cited by examiner

*Primary Examiner*—Almis R. Jankus
*Assistant Examiner*—Jon Hadidi
(74) *Attorney, Agent, or Firm*—Charles E. Baxley

(57) ABSTRACT

A method and system for clearing depth and color buffers in a real time graphics rendering system 10. The method and system are able to improve both depth and color buffer clearing. The method and system may utilize a frame flag, a depth clearing module, and a fast color and frame flag clearing module. The system assigns a frame flag to each pixel, which is used to determine whether the current Z value for the pixel is valid. The frame flag may be attached to Z value in the depth buffer. Instead of filling entire depth and color buffers with background values, the system only fills the holes that were not drawn in the previous frame. The fast color and frame flag clearing module traverses a rectangular area, tile by tile, where a tile is a block of pixels, to determine whether each pixel is background by checking the frame flags that are read from the depth buffer. If at least one pixel of a tile is background, the module updates those pixels' color with background color by sending requests to memory interface.

17 Claims, 5 Drawing Sheets

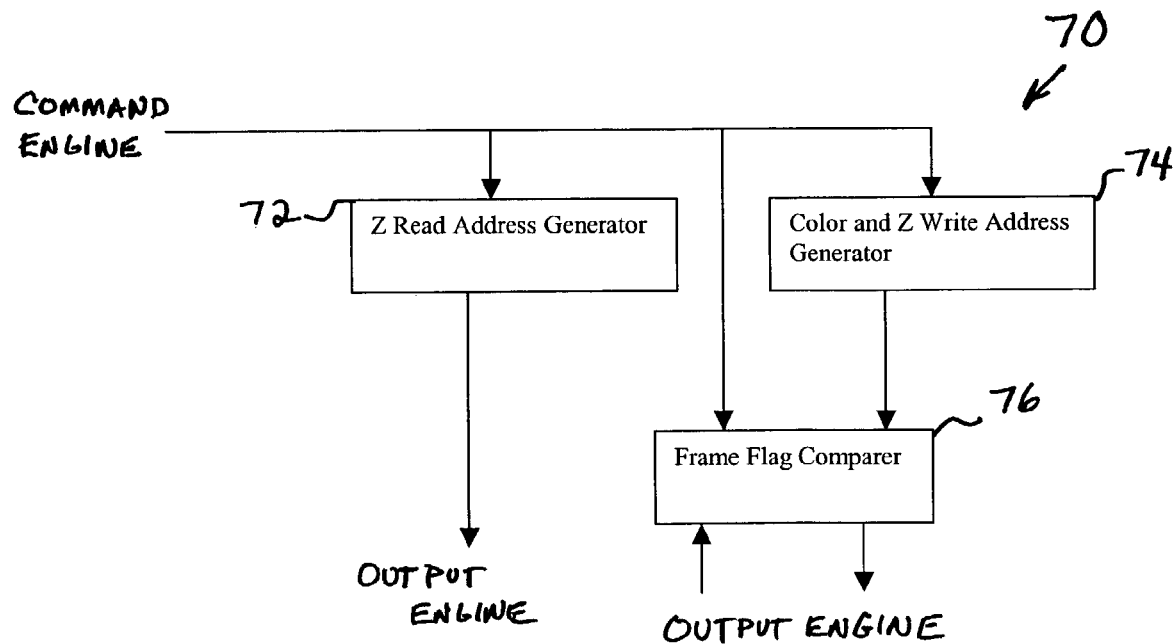
Figure 5
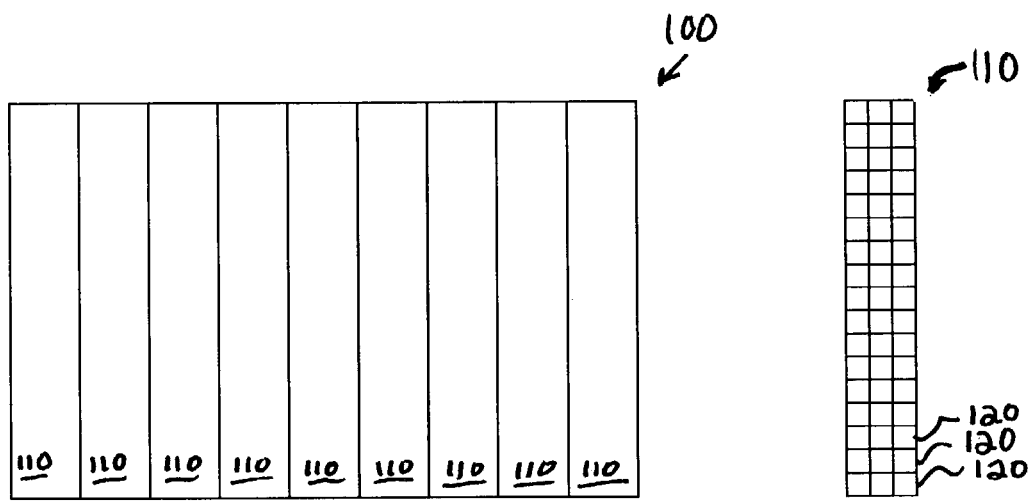
Figure 6
Figure 7

US 6,982,713 B2

SYSTEM AND METHOD FOR CLEARING DEPTH AND COLOR BUFFERS IN A REAL-TIME GRAPHICS RENDERING SYSTEM

FIELD OF THE INVENTION

The present invention relates generally to digital image processing and the display of digitally rendered images, and more particularly to a system and method for clearing depth and color buffers in a system for real-time rendering of digitally displayed images.

BACKGROUND OF THE INVENTION

A real-time graphics rendering system is used to create animation for graphics applications, such as video games. An animation is typically composed of a sequence of many frames. Each frame is an image that is created by the system from many primitives and control states.

Rendering of three-dimensional scenes typically requires realistic representation of multiple objects in the field of view. The distance of each object from the point of view (also known in 3D graphics as camera position) can determine whether the object blocks (occludes) or is blocked by other objects in the scene. Even in the case of a single object, some of its parts may block or be blocked by other parts depending upon each part's distance from the point of view. Methods and apparatus used to resolve occlusions and eliminate hidden surfaces play an important role in the creation of realistic images of three-dimensional scenes.

Many popular algorithms for hidden surface elimination utilize a special depth buffer, also known as a Z buffer. Each new pixel at a two-dimensional location X, Y on the screen is associated with a depth value Z. This value is compared with a depth value stored in the depth buffer at the location corresponding to the same X, Y coordinate. A visibility test compares the new and stored depth values; if the visibility test passes, meaning the new object is closer and therefore blocks the portion of the prior object at the same coordinates, then the depth value in the depth buffer is updated.

Here a pixel is defined as a set of parameters that represent an area of the object's surface corresponding to a point of the raster grid associated with the screen coordinate space. These parameters can include the two-dimensional coordinates of the point in the raster grid, as well as its color and depth values which correspond to the locations for the area as stored in a color buffer and in a depth buffer. A pixel is visible if its color and depth values are stored at the corresponding locations in the color buffer and in the depth buffer after scene rendering is completed. A pixel is invisible if its parameters are overwritten by another pixel having a depth value corresponding to the smaller distance from the camera.

The color of each pixel is generated by a primitive that is written to a color frame buffer, while the depth or Z value of the pixel is written to the depth buffer. If more than one primitive covers the same pixel, only the color of the pixel with the least depth is finally stored in the frame buffer. During the process of frame rendering, a depth engine ensures that the color of a pixel with the least depth value is written to the frame buffer by comparing the depth of a current pixel to the depth value stored in the depth buffer. After all primitives of a frame are rendered, the color buffer stores the final image of the frame.

At the beginning of a frame, the depth buffer has to be cleared to a value specified by the application so that the depth engine can process pixels correctly. Sometimes the color buffer must also be cleared to a specified color. These processes consume relatively large amounts of time and memory bandwidth. As a result, many researchers have proposed solutions to improve rendering efficiency, such as hierarchical Z buffer visibility, fast Z clear and lossless Z compression, and quasi-Z methods. While these methods do provide some improvement, they are still relatively slow and/or consume undesirably large amounts of memory bandwidth.

The present invention provides an improved system and method for clearing depth and color buffers in a real-time graphics rendering system, which substantially reduces the number of required clear actions and the associated memory consumption.

SUMMARY OF THE INVENTION

In general, the invention features a system and method for clearing depth and color buffers for use in a real-time graphics rendering system. The system and method utilize a frame flag, a depth buffer clearing circuit or module, and a fast color and frame flag clearing circuit or module. Each pixel is assigned a frame flag that may be used to determine whether the current depth or Z value is valid. The flag may be attached to the Z value in the depth or Z buffer. The comparison circuit calculates a mask signal based on the frame flag, the Z value from the Z buffer, and the source Z value of primitives. Instead of filling the entire depth and color buffers with background values, the present system fills the "holes" that were not drawn in the previous frame. The fast color and frame flag clear circuit traverses a rectangular area (e.g., a view port area), tile by tile (e.g., a tile being a block of pixels), to determine whether each pixel is background by checking the frame flags that may be read from the Z buffer. If at least one pixel of the tile is background, the fast color and frame flag clear circuit updates those pixels' color with background color by sending requests to a memory interface. However, if none of the pixels of the tile is background, the system takes no action. At the end of each frame, most of the pixels in the view port may be updated. Therefore, only limited extra memory bandwidth is used to fill the holes. In most cases, the present system and method can save about 90% of memory bandwidth typically used for depth and color buffer clearing.

According to one aspect of the present invention, a system for clearing a depth buffer for storing depth values of pixels in a three dimensional graphics rendering system is provided. The system includes a first portion for adding a first frame flag to a depth value for a pixel, the first frame flag identifying a current frame. The system also includes a second portion for receiving a previous depth value for the pixel, comparing a frame flag of the previous depth value to the first frame flag, and replacing the previous depth value with an initial depth value if the frame flag is different from the current frame flag, the initial depth value having a frame flag equal to the first frame flag.

According to another aspect of the present invention, a system is provided for determining the depth of a pixel in a three dimensional real time graphics rendering system having a depth buffer for storing depth values and a frame buffer for storing data that forms an image. The system includes: a first portion that is adapted to receive a depth value associated with a pixel and to add a current frame flag to the depth value to generate a first depth value; a second portion that is adapted to receive a previous depth value for the pixel, to compare a frame flag of the previous depth value to the current frame flag, and to generate a second depth value, the second depth value being equal to the previous depth value if the frame flag is equal to the current frame flag, or to an initial depth value if the frame flag is different from the current frame flag, the initial depth value having a frame flag equal to the current frame flag; and a third portion that is adapted to receive the first and second depth values, to compare the first and second depth values to determine whether the pixel is masked, and to write the first depth value to the frame buffer if the pixel is not masked.

According to another aspect of the present invention, a method is provided for clearing a depth buffer for storing depth values for pixels in a three dimensional graphics rendering system. The method includes the steps of: adding a first frame flag to a depth value for a pixel, the first frame flag identifying a current frame; receiving a previous depth value for the pixel; comparing a frame flag of the previous depth value to the first frame flag; and replacing the previous depth value with an initial depth value if the frame flag is different from the current frame flag, the initial depth value having a frame flag equal to the first frame flag.

These and other features and advantages of the present invention will become more apparent from the following description, drawings, and claims.

BRIEF DESCRIPTION OF THE DRAWINGS

FIG. 5 is a block diagram of a method and system for clearing a color buffer, according to the present invention.

FIG. 6 illustrates an exemplary layout of a rectangle divided into a plurality of bands, which may be used by the system shown in FIG. 5 to clear a color buffer.

FIG. 7 illustrates a manner in which a band may be subdivided into a plurality of blocks by the system shown in FIG. 5.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention.

Figure 1:
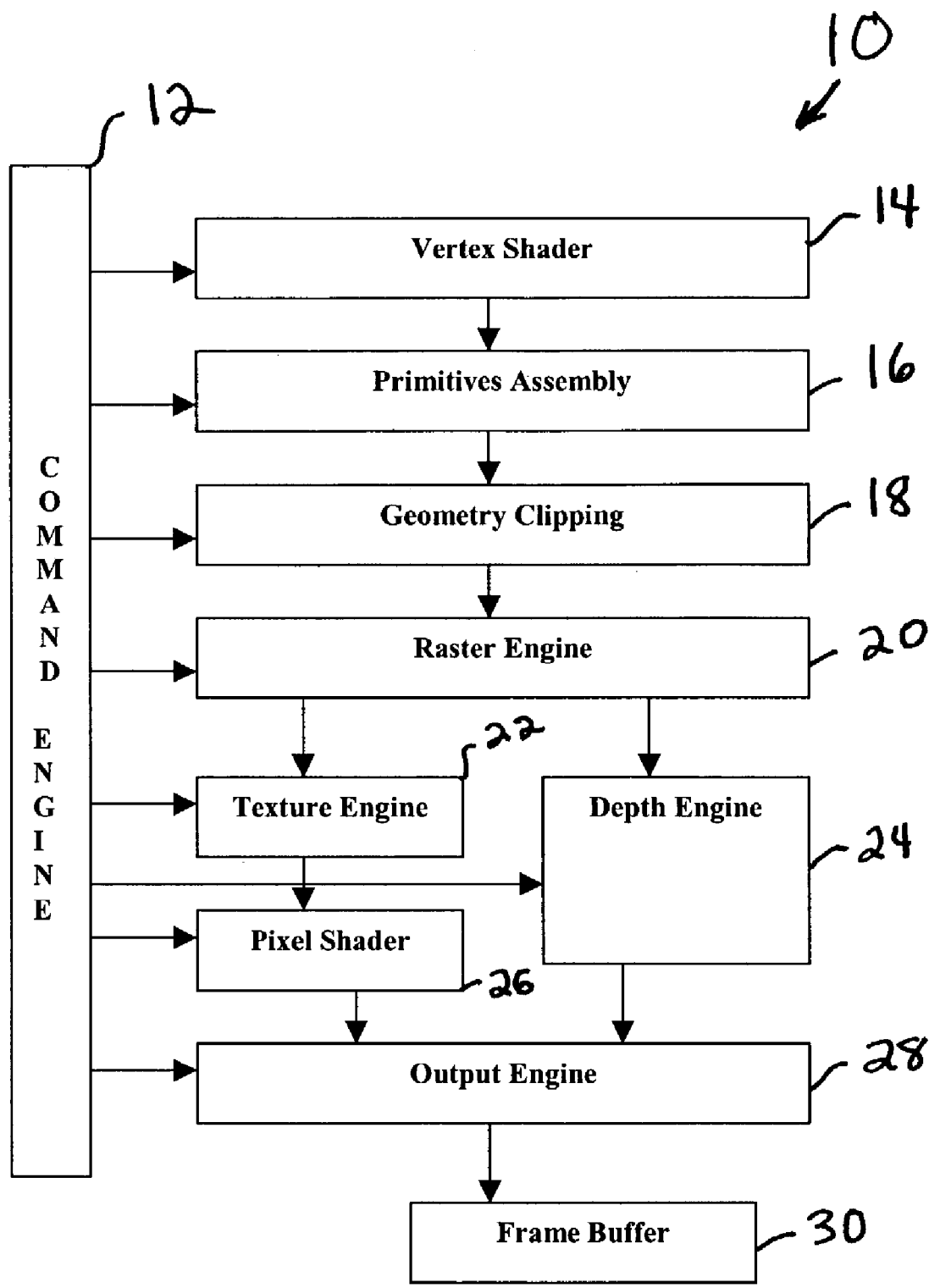
FIG. 1 is a block diagram of an embodiment of a real time graphics rendering system employing a system and method for clearing depth and color buffers, according to the present invention.

The present invention provides an improved system and method for clearing depth and color buffers for use in a real-time graphics rendering system. The preferred embodiment of the system and method may be implemented on a real-time graphics rendering system, such as system 10 shown in FIG. 1.

Real-time graphics rendering system 10 may be used to create animation for graphics applications, such as video games. An animation is composed of a sequence of many frames. Each frame is an image that may be created by system 10 from many primitives and control states. System 10 may include a command engine block or portion 12, a vertex shader block or portion 14, a primitives assembly block or portion 16, a geometry clipping block or portion 18, a raster engine 20, a texture engine 22, a depth engine 24, a pixel shader 26, an output engine 28 and a frame buffer 30.

The command engine 12 provides an interface to a driver, which provides commands from applications. Command engine 12 transfers the received command data to vertices and control states, and sends them to vertex shader block 14. The vertex shader block 14 transforms lightings and vertices according to the control states and communicates them to primitives assembly block 16. Primitives assembly block 16 is adapted to assemble the vertices to form a primitive and sends the assembled primitive to geometry clipping block 18. Geometry clipping block 18 clips the primitive to a view frustum and passes the result to raster engine 20. The raster engine 20 converts the primitive to pixels and calculates color information and depth information for each pixel of the primitive. The raster engine 20 communicates the color information to texture engine 22, and communicates the depth information to depth engine 24.

The texture engine generates texture elements or texels according to the color information, interpolates those texels and communicates the results (i.e., textures, with color information) to pixel shader block 26. The pixel shader block 26 blends all the colors from texture engine 22, and calculates the final color of the related pixel and communicates it to the output engine 28. The depth engine 24 receives the depth information from raster engine 20 and also reads the old or former depth of the related pixel from the frame buffer 30. The depth engine 24 calculates a mask according to the control states and communicates the mask to output engine 28 with a depth value from the raster engine 20. The output engine 28 checks the mask to determine if the pixel is masked, and writes the color and depth of this pixel to frame buffer 30 if it is not masked. The frame buffer 30 stores the final image.

A depth value corresponds to the distance of a pixel to a view point. The depth buffer or Z buffer, which may be incorporated within the depth engine, is used to store the least depth of each pixel. The color of a pixel covered by a primitive is written to a color frame buffer (e.g., frame buffer 30), and the depth of the pixel is written to a depth buffer. If more than one primitive covers the same pixel, only the color of the pixel with the least depth is finally stored in the frame buffer 30. During the process of frame rendering, the depth engine ensures that the color of the pixel with the least depth is written to the frame buffer 30 by comparing the depth of the current pixel to the depth stored in depth buffer. After all primitives of a frame are rendered, the frame buffer 30 stores the final image of the frame.

At the beginning of a frame, the depth buffer has to be cleared to a value specified by the application so that depth engine can process pixels correctly. Occasionally, the color buffer also must be cleared to a specified color. The present invention provides an improved depth and output engine, which cooperatively reduce the required clear actions.

Prior art depth engines typically just compare the Z of the current primitive to the Z of the previous primitive in the depth buffer. A conventional depth engine does not clear the Z buffer. Rather, an application communicates a clear primitive (usually in the form of a rectangle) to the rendering system. The rendering system then renders the clear primitive, effective to clear the depth buffer. This type of system consumes substantial time and memory bandwidth.

Figure 2:
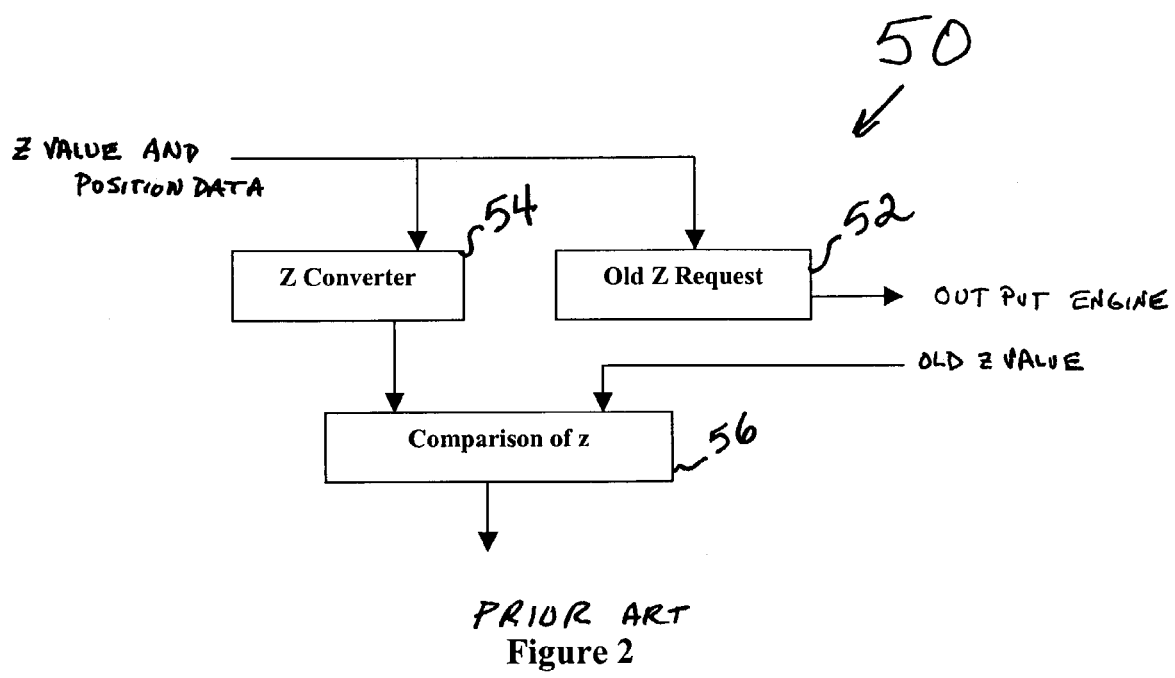
FIG. 2 is a block diagram of a method and system for clearing a depth buffer, according to the prior art.

FIG. 2 is a block diagram 50 illustrating the operation of a prior art method and system for clearing a Z buffer. The depth engine 24 receives the depth information of a pixel (e.g., the Z value and coordinates of the pixel) from raster engine 20 and then sends a request to the output engine 28 to read the previous Z value of the pixel from the Z buffer, as shown in block 52. The output engine 28 returns the old Z value for the pixel to block 56. The depth engine 24 also converts the current pixel's Z value to a complimentary Z value, as shown in block 54. This process is described in U.S. Pat. No. 6,285,779 of Lapidous et al. (the '779 patent), which is assigned to the present assignee and which is incorporated herein by reference. The depth engine then compares the converted Z value to the old Z value for the same location, as shown in block 56. If the comparison result is false (i.e., if the pixel is masked), no Z value or color value is written to the frame buffer. (Depending on the convention used for the complementary depth values, if the current complementary depth value is greater than or less than the stored complementary depth value, the pixel is either visible or not.) If the comparison is true (i.e., if the pixel is not masked), the converted Z value and associated color is written to the frame buffer.

Figure 3:
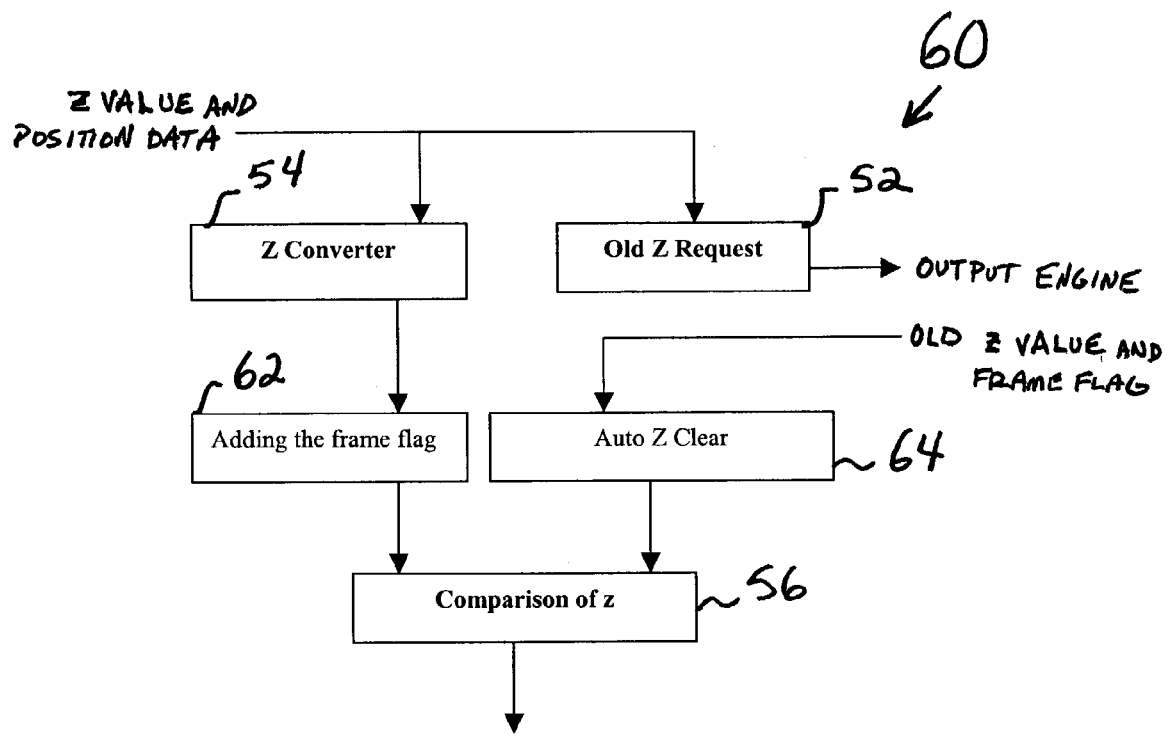
FIG. 3 is a block diagram of one embodiment of a method and system for clearing a depth buffer, according to the present invention.

FIG. 3 illustrates a method and system 60 for automatically clearing a depth buffer, according to the present invention. System 60 may form a portion of the depth engine 24 or may be a stand-alone module. While the present invention will be primarily described in relation to a system 60, it should be appreciated that each of the portions or blocks illustrated in FIG. 3 (as well as the portions or blocks illustrated in the other Figures) may represent logic steps or processes and/or the hardware and/or software utilized to perform the logic steps or processes. It should further be appreciated that any one or more of the portions or blocks shown can be implemented in a computer readable medium as part of a system. In the preferred embodiment, conventional hardware, software and/or firmware may be used to perform the logic steps and/or processes.

As shown in FIG. 3, the Z clearing circuit, method or system 60 of the present invention includes a step or block that adds a frame flag to each Z value so that the system can determine whether the Z value belongs to the current frame, when reading back the Z value from the depth buffer. In the present invention, the system 60 receives a Z value and position (e.g., coordinates) of a pixel from the raster engine 20. The system 60 may apply a Z converter to the Z value (e.g., in the manner taught by the '779 patent), as shown in block 54. The system 60 then adds the current frame flag (from the command engine 12) to the converted Z value, as shown in block 62. In one embodiment, the frame flag may comprise a one-bit flag, which is added as the first bit of a multi-bit depth value. For example, in an odd frame, "0" may be the frame flag, and the resulting Z value may take the form "0xxxxxxxxxxxxxxxxxxxxxxx" for a 24-bit Z value (i.e., the first bit is the frame flag, and is set to zero). Similarly, for an even frame, "1" may be the frame flag, and all Z values take the form "1xxxxxxxxxxxxxxxxxxxxxxx" (i.e., the first bit is the frame flag, and is set to one). In other embodiments, the frame flag may take any other suitable form and/or may comprise any other one or more bits of a depth value. When reading a Z value, the system can determine which frame the Z value belongs to by checking the first bit. The converted Z value with frame flag is passed to comparison block 56.

The coordinates of the pixel are also used by the system 60 to generate a request to read the previous Z value at the same position, as shown in block 52. The request is communicated to the output engine 28, and may include the address of the current pixel in the depth buffer. The output engine 28 processes the request and returns the Z value and attached frame flag to the auto Z clear block 64. The auto Z clear block 64 may then compare the old Z frame flag to the current frame flag received from the command engine 12. If the old Z frame flag is the same as the current frame flag, the auto Z clear block 64 passes the old Z value and frame flag to comparison block 56. If the old Z frame flag is not same as the current frame flag (which means the location of the pixel has not been written by a primitive of the current frame, and the data remains from a previous frame), the old Z value is discarded, and an initial Z value, having a frame flag set to the current frame flag, replaces the old Z value. The current Z value and the initial Z value are then sent to the comparison block 56.

In block 56, the depth engine compares the converted Z value from block 62 to the Z value from auto Z clear block 64 (i.e., the old Z value or the initial Z value) for the same location. If the comparison result is false (i.e., if the pixel is masked), no Z value or color value is written to the frame buffer. (Depending on the convention used for the complementary depth values, if the current complementary depth value is greater than or less than the stored complementary depth value, the pixel is either visible or not.) If the comparison is true (i.e., if the pixel is not masked), the converted Z value and associated color is written to the frame buffer.

In the preferred embodiment, the command engine 12 clears the depth buffer to 0 (i.e., clears all Z values in the depth buffer to 0) at the beginning of an application or game, and sets the frame flag of the first frame to 1. After this occurs, the system does not have to clear the entire depth buffer again. Rather, the command engine 12 simply flips or changes the frame flag, thereby allowing the depth engine 24 to automatically detect the background pixels.

Figure 4:
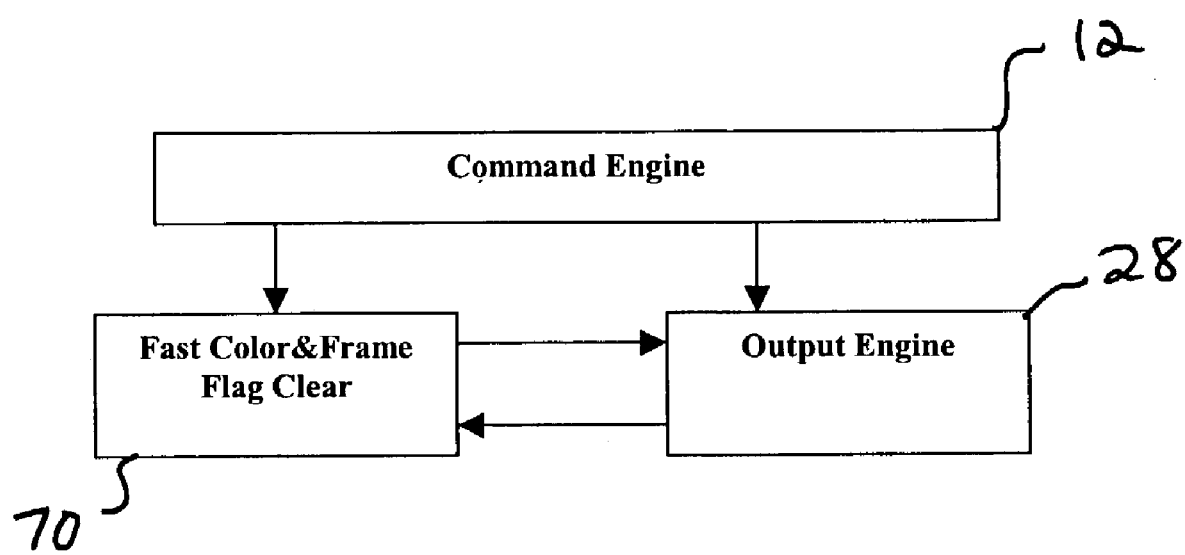
FIG. 4 is a flow diagram illustrating the interaction between a system for clearing a color buffer and command and output engines, according to the present invention.

Periodically, applications may issue a color buffer clear command, when a frame is not fully covered by primitives. This type of situation may cause some "holes" to appear in the displayed image. The frame flags of the pixels corresponding to the holes are not changed and the colors of the pixels may remain from the previous frame. This may cause errors in the displayed image. The system may further include a fast color and frame flag clear circuit, module or system to solve this problem. FIG. 4 illustrates a fast color and frame flag clear module 70, which may be communicatively coupled to the command engine 12 and the output engine 28 to address this problem.

The fast color and frame flag clear circuit or module traverses an area (e.g., a rectangular view port area), tile by tile, where a tile is a block of pixels, to determine whether each pixel is background. The module 70 determines whether each pixel is background by checking the frame flags that are read from depth buffer. If at least one pixel of the block is background, the module updates those pixels' color with background color by sending requests to the memory interface. If none of the pixels is background, no action is taken. At the end of each frame, most of the pixels in the view port are updated, so only limited extra memory bandwidth is required to fill the holes. In most cases, the present system can save about 90% of memory bandwidth that is typically required to clear the depth and color buffers.

FIG. 5 illustrates one embodiment of a fast color and frame flag clear module 70. The command engine 12 communicates rectangle identification information (e.g., the coordinates of the upper left corner, width and height of the rectangular area to be traversed) and the current frame flag to module 70. In alternate embodiments, different shapes and coordinates may be used. Module 70 divides the rectangle into a plurality of bands of a predetermined size, and further subdivides each band into a plurality of blocks. FIG. 6 illustrates an exemplary layout of a rectangle 100 divided into a plurality of bands 110. FIG. 7 illustrates a band 110 subdivided into a plurality of blocks 120. Each of the blocks 120 may contain a plurality of pixels (e.g., 16 pixels). The Z read address generator block 72 creates addresses for each of the blocks, block-by-block in a band, and band by band in a rectangle. The addresses are sent to the output engine 28. In response, the output engine 28 communicates the Z data (i.e., Z value and attached flag) for each pixel in the block to the frame flag comparer block 76.

At the same time, the color and Z write address generator block 74 creates color write addresses and Z write addresses for each of the blocks in the rectangle. The Z write address is the same and the Z read address for the same block, but is created again for performance issues. (For example, recalculating the address saves time. If the address is not recalculated, the address would have to be stored in a buffer while the Z data is read back from the output engine. The speed of the system would then be limited by the length of the buffer.) The addresses are sent to the frame flag comparer block 76.

The frame flag comparer block 76 receives the current frame flag, and the Z values and attached frame flags for each pixel in the block. The frame flag comparer block 76 checks if the frame flag of any pixel in the block differs from the current frame flag. If no frame flag is different, the comparer block 76 discards the color and Z write addresses. If there is at least one difference, the comparer block 76 generates color and Z write requests (i.e., write masks) from the color and Z write addresses. The color and Z write requests or masks are created from the result of the comparisons. The write requests mask the pixels that have the same frame flag as the current frame flag. In one embodiment, for each pixel of the block, the mask is set to 0 if the flag is not the same and 1 if the flag is the same. When writing a block to a frame, the masks are first checked. If the mask is 0, the pixel is written, and if the mask is 1, the pixel is not written. For the pixels having different frame flags from the current frame flag, the fast color and frame flag clear module 70 sends a write request for an initial color (e.g., a background color) to the associated pixel, and clears the frame flag by sending a Z write request with an initial Z value to the output engine 28. The output engine 28 writes the color and Z data into the color buffer and the depth buffer, respectively.

As set forth above, the present invention provides an efficient method and system for clearing the depth and color buffers in a real time graphics rendering system. The method and system of the present invention utilize a frame flag to distinguish between pixels of different frames, and which allows the system to perform only limited clearing of the depth and color buffers. In most cases, the present system and method can save about 90% of memory bandwidth typically used for depth and color buffer clearing.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications. It should be further apparent to those skilled in the art that the various embodiments are not necessarily exclusive, but that features of some embodiments may be combined with features of other embodiments while remaining with the spirit and scope of the invention.

What is claimed is:

1. A system for clearing a depth buffer for storing depth values for pixels in a three dimensional graphics rendering system, comprising:
   a first portion for adding a first frame flag to a depth value for a pixel, the first frame flag identifying a current frame;
   a second portion for receiving a previous depth value for the pixel, comparing a frame flag of the previous depth value to the first frame flag, and replacing the previous depth value with an initial depth value if the frame flag is different from the current frame flag, the initial depth value having a frame flag equal to the first frame flag; and
   a third portion for clearing a color buffer, the third portion being adapted to check the frame flags of a plurality of pixels in a first area, and to assign an initial color to any of the plurality of pixels having a frame flag that is different from the current frame flag, wherein the third portion is adapted to assign an initial depth value to any of the plurality of pixels having a frame flag that is different from the current frame flag and adapted to mask any of the plurality of pixels in the first area which have a frame flag that is the same as the current frame flag.

2. The system, as recited in claim 1, wherein the frame flag comprises a one-bit flag.

3. The system, as recited in claim 1, wherein the depth value comprises a multi-bit value.

4. The system, as recited in claim 3, wherein the depth value comprises a 24-bit value.

5. The system, as recited in claim 3, wherein the frame flag comprises the first bit of the multi-bit value.

6. The system, as recited in claim 1, further comprising a converter for converting the depth value into a complementary value prior to adding the first frame flag.

7. A system for clearing a depth buffer for storing depth values for pixels in a three dimensional graphics rendering system, comprising:
   a first portion for adding a first frame flag to a depth value for a pixel, the first frame flag identifying a current frame;
   a second portion for receiving a previous depth value for the pixel, comparing a frame flag of the previous depth value to the first frame flag, and replacing the previous depth value with an initial depth value if the frame flag is different from the current frame flag, the initial depth value having a frame flag equal to the first frame flag; and
   a third portion for clearing a color buffer, the third portion being adapted to check the frame flags of a plurality of pixels in a first area, and to assign an initial color to any of the plurality of pixels having a frame flag that is different from the current frame flag, wherein the first area is a rectangle and the third portion is adapted to subdivide the first area into a plurality of blocks, each of the blocks having a plurality of pixels, and to check the frame flags of the pixels, block by block.

8. The system, as recited in claim 7, wherein the frame flag comprises a one-bit flag.

9. The system, as recited in claim 7, wherein the depth value comprises a multi-bit value.

10. The system, as recited in claim 9, wherein the depth value comprises a 24-bit value.

11. The system, as recited in claim 9, wherein the frame flag comprises the first bit of the multi-bit value.

12. A system for determining the depth of a pixel in a three dimensional real time graphics rendering system having a depth buffer for storing depth values and a frame buffer for storing data that forms an image, the system comprising:
   a first portion that is adapted to receive a depth value associated with a pixel and to add a current frame flag to the depth value to generate a first depth value;
   a second portion that is adapted to receive a previous depth value for the pixel, to compare a frame flag of the previous depth value to the current frame flag, and to generate a second depth value, the second depth value being equal to the previous depth value if the frame flag is equal to the current frame flag, or to an initial depth value if the frame flag is different from the current frame flag, the initial depth value having a frame flag equal to the current frame flag;
   a third portion that is adapted to receive the first and second depth values, to compare the first and second depth values to determine whether the pixel is masked, and to write the first depth value to the frame buffer if the pixel is not masked; and
   a fourth portion for clearing a color values stored in the frame buffer, the fourth portion being adapted to check the frame flags of a plurality of pixels in a first area, and if any of the plurality of pixels has a frame flag that is different from the current frame flag, to assign an initial color to any such pixel, wherein the fourth portion is further adapted to assign an initial depth value to any of the plurality of pixels having a frame flag that is different from the current frame flag and adapted to mask any of the plurality of pixels in the first area which have a frame flag that is the same as the current frame flag.

13. The system, as recited in claim 12, wherein the frame flag comprises a one-bit flag.

14. The system, as recited in claim 12, wherein the depth value comprises a multi-bit value.

15. The system, as recited in claim 14, wherein the depth value comprises a 24-bit value.

16. The system, as recited in claim 14, wherein the frame flag comprises the first bit of the multi-bit value.

17. A system for determining the depth of a pixel in a three dimensional real time graphics rendering system having a depth buffer for storing depth values and a frame buffer for storing data that forms an image, the system comprising:
   a first portion that is adapted to receive a depth value associated with a pixel and to add a current frame flag to the depth value to generate a first depth value;
   a second portion that is adapted to receive a previous depth value for the pixel, to compare a frame flag of the previous depth value to the current frame flag, and to generate a second depth value, the second depth value being equal to the previous depth value if the frame flag is equal to the current frame flag, or to an initial depth value if the frame flag is different from the current frame flag, the initial depth value having a frame flag equal to the current frame flag;
   a third portion that is adapted to receive the first and second depth values, to compare the first and second depth values to determine whether the pixel is masked, and to write the first depth value to the frame buffer if the pixel is not masked; and a fourth portion for clearing a color values stored in the frame buffer, the fourth portion being adapted to check the frame flags of a plurality of pixels in a first area, and if any of the plurality of pixels has a frame flag that is different from the current frame flag, to assign an initial color to any such pixel, wherein the first area is a rectangle and the fourth portion is adapted to subdivide the first area into a plurality of blocks, each of the blocks having a plurality of pixels, and to check the frame flags of the pixels, block by block.

* * * * *